United States Patent

Leary

Patent Number: 5,832,968
Date of Patent: Nov. 10, 1998

[54] FUEL OVERFILL WARNING DEVICE

[76] Inventor: Judith Anne Leary, 160 Water St., South Norwalk, Conn. 06854

[21] Appl. No.: 873,200

[22] Filed: Jun. 11, 1997

[51] Int. Cl.⁶ .................. B65B 1/04; B65B 3/04
[52] U.S. Cl. .................. 141/94; 116/109; 116/112
[58] Field of Search .................. 141/59, 94, 95, 141/86; 114/343; 116/109, 112, 264, 265, 266, 137 R, 140; 340/984

[56] References Cited

U.S. PATENT DOCUMENTS

| | | | |
|---|---|---|---|
| 5,023,608 | 6/1991 | Delisle, Jr. et al. | 340/948 |
| 5,230,372 | 7/1993 | Westphal | 141/95 |
| 5,515,891 | 5/1996 | Langlois | 141/95 |

*Primary Examiner*—Steven O. Douglas

[57] ABSTRACT

A fuel overfill warning device including a vent tube. A whistle alarm is positioned within the vent tube. A pair of flexible hoses engage opposing end portions of the vent tube. The whistle alarm will emit an audible signal as air is forced out of the vent line of the fuel tank while pumping fuel. As the tank approaches a full level, the audible signal will gradually decrease and then cease.

2 Claims, 3 Drawing Sheets

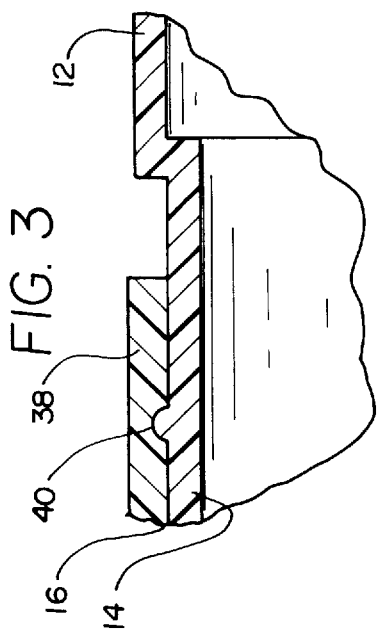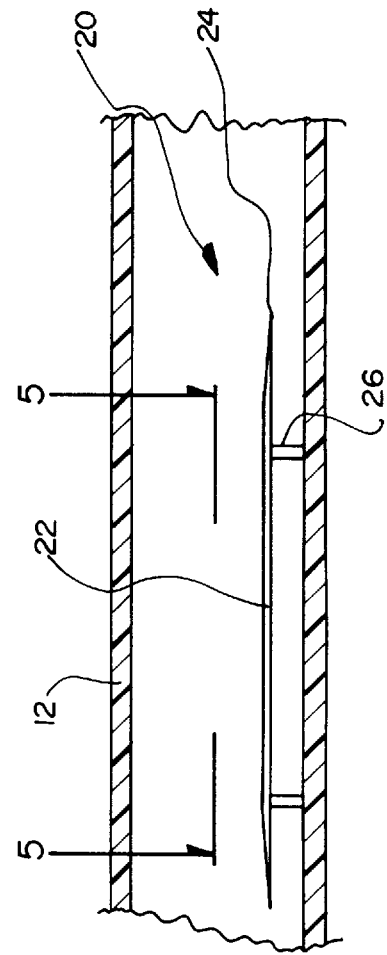

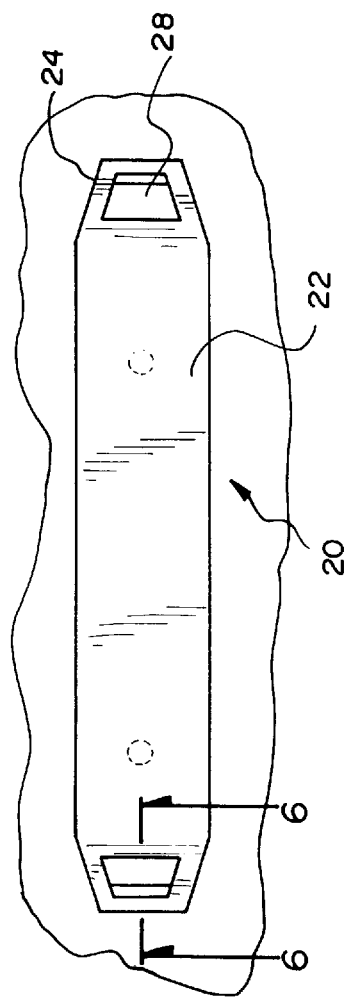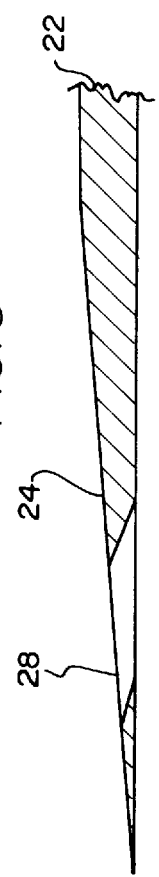

FUEL OVERFILL WARNING DEVICE

BACKGROUND OF THE INVENTION

1. Field of the Invention

The present invention relates to a fuel overfill warning device and more particularly pertains to warning of potential overflow and spillage of fuel while refueling boats and the like with a fuel overfill warning device.

2. Description of the Prior Art

The use of fuel control devices is known in the prior art. More specifically, fuel control devices heretofore devised and utilized for the purpose of limiting fuel discharge are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,181,022 to Schupp discloses an apparatus for use in refueling marine tanks.

U.S. Pat. No. 4,997,013 to Peckels discloses a liquid fill level indicator.

U.S. Pat. No. 5,023,608 to Delisle, Jr. et al. discloses a fuel filler alarm for boats.

U.S. Pat. No. 5,229,766 to Hargest discloses a marine fuel tank pollution control apparatus.

U.S. Pat. No. Des. 309,274 to Gray discloses the ornamental design for a whistle.

U.S. Pat. No. 5,275,216 to Haedt discloses a liquid overflow shut-off valve.

While these devices fulfill their respective, particular objective and requirements, the aforementioned patents do not describe a fuel overfill warning device for warning of potential overflow and spillage of fuel while refueling boats and the like.

In this respect, the fuel overfill warning device according to the present invention substantially departs from the conventional concepts and designs of the prior art, and in doing so provides an apparatus primarily developed for the purpose of warning of potential overflow and spillage of fuel while refueling boats and the like.

Therefore, it can be appreciated that there exists a continuing need for new and improved fuel overfill warning device which can be used for warning of potential overflow and spillage of fuel while refueling boats and the like. In this regard, the present invention substantially fulfills this need.

SUMMARY OF THE INVENTION

In the view of the foregoing disadvantages inherent in the known types of fuel control devices now present in the prior art, the present invention provides an improved fuel overfill warning device. As such, the general purpose of the present invention, which will be described subsequently in greater detail, is to provide a new and improved fuel overfill warning device and method which has all the advantages of the prior art and none of the disadvantages.

To attain this, the present invention essentially comprises a vent tube having an elongated and cylindrical configuration. The vent tube has a diameter. The vent tube has opposed open end portions each having a diameter less than the vent tube. Each of the open end portions has an annular protrusion circumferentially disposed thereon. A whistle alarm is positioned within the vent tube. The whistle alarm is comprised of an elongated body portion. The elongated body portion has beveled end portions. A pair of rods extend downwardly from the elongated body portion for securement to the vent tube. Each of the beveled end portions has angularly disposed apertures therethrough. A pair of elongated and cylindrical flexible hoses are dimensioned for coupling with a vent line of a fuel tank. Each of the hoses has a flexible body portion and opposed rigid end portions. The rigid end portions include an inner end portion and an outer end portion. Each inner portion has an annular recess circumferentially disposed on an interior surface thereof for engagement with the annular protrusions of the vent tube. A pair of hose clamps are dimensioned for coupling the pair of flexible hoses to the vent tube. The hose clamps adjustably couple over the inner end portions and the end portions of the vent tube.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fuel overfill warning device which has all the advantages of the prior art fuel control devices and none of the disadvantages.

It is another object of the present invention to provide a new and improved fuel overfill warning device which may be easily and efficiently manufactured and marketed.

It is a further object of the present invention to provide a new and improved fuel overfill warning device which is of durable and reliable construction.

An even further object of the present invention is to provide a new and improved fuel overfill warning device which is susceptible of a low cost of manufacture with regard to both materials and labor, and which accordingly is then susceptible of low prices of sale to the consuming public, thereby making such a fuel overfill warning device economically available to the buying public.

Even still another object of the present invention is to provide a new and improved fuel overfill warning device for warning of potential overflow and spillage of fuel while refueling boats and the like.

Lastly, it is an object of the present invention to provide a new and improved fuel overfill warning device including a vent tube. A whistle alarm is positioned within the vent tube. A pair of flexible hoses are dimensioned for coupling with a vent line of a fuel tank. Each of the hoses engage opposing end portions of the vent tube. The whistle alarm will emit an audible signal as air is forced out of the fuel tank while pumping fuel. As the tank approaches a full level, the audible signal will cease.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a view of the coupling between the flexible hose and the vent tube as taken from circle 3 of FIG. 2.

FIG. 4 is a side view of the whistle alarm positioned within the vent tube.

FIG. 5 is a cross-sectional view as taken along line 5—5 of FIG. 4.

FIG. 6 is a cross-sectional view as taken along line 6—6 of FIG. 5.

The same reference numerals refer to the same parts through the various Figures.

DESCRIPTION OF THE PREFERRED EMBODIMENT

Figure 1:
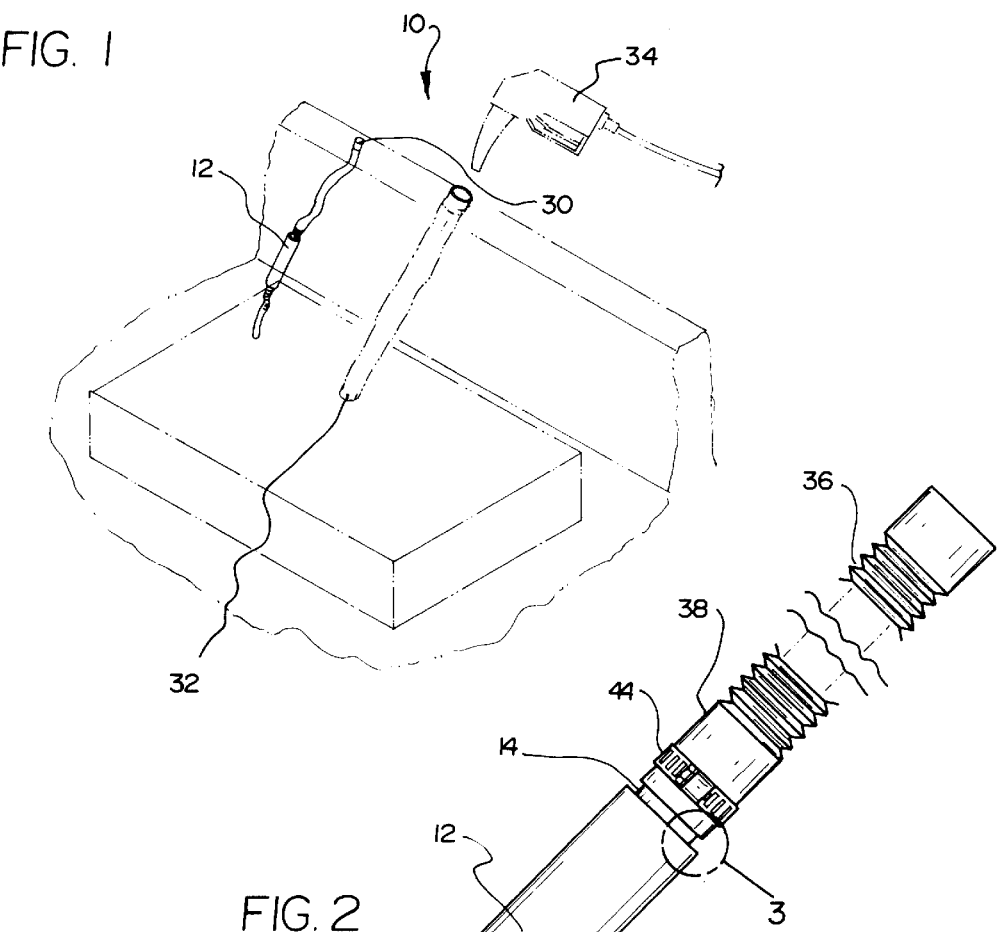
FIG. 1 is a perspective view of the preferred embodiment of the fuel overfill warning device constructed in accordance with the principles of the present invention illustrated in use.
Figure 2:
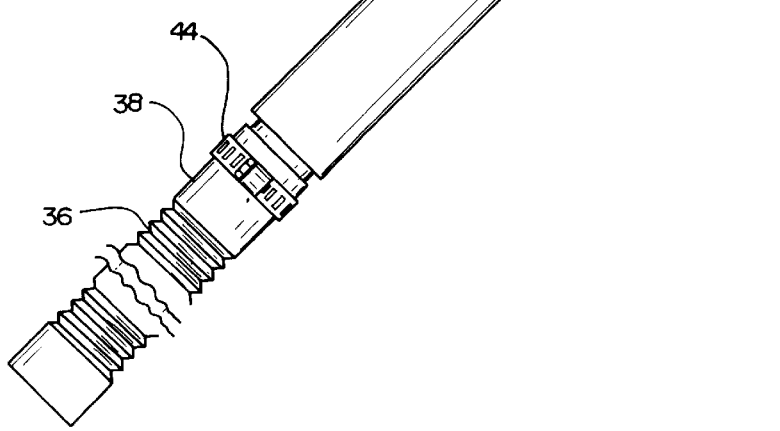
FIG. 2 is an isolated perspective view of the present invention.

With reference now to the drawings, and in particular, to FIGS. 1 through 6 thereof, the preferred embodiment of the new and improved fuel overfill warning device embodying the principles and concepts of the present invention and generally designated by the reference number 10 will be described.

Specifically, it will be noted in the various Figures that the device relates to a fuel overfill warning device for warning of potential overflow and spillage of fuel while refueling boats and the like. In its broadest context, the device consists of a vent tube, a whistle alarm, a pair of flexible hoses and a pair of hose clamps. Such components are individually configured and correlated with respect to each other so as to attain the desired objective.

The device 10 includes a vent tube 12 having an elongated and cylindrical configuration. The vent tube 12 has a diameter. The vent tube 12 has opposed open end portions 14 each having a diameter less than the vent tube 12. Each of the open end portions 14 has an annular protrusion 16 circumferentially disposed thereon. The vent tube 12 is preferably fabricated of stainless steel or a rigid plastic, such as PVC.

A whistle alarm 20, as illustrated in FIGS. 4–6, is positioned within the vent tube 12 preferably as close to the bottom of the vent tube 12. The whistle alarm 20 is comprised of an elongated body portion 22. The elongated body portion 22 has beveled end portions 24. A pair of rods 26 extend downwardly from the elongated body portion 22 for securement to the vent tube 12. Each of the beveled end portions 24 has angularly disposed apertures 28 therethrough.

A pair of elongated and cylindrical flexible hoses 30 are dimensioned for coupling with a vent line of the fuel tank 32. Note FIG. 1. Each of the hoses 30 has a flexible body portion 36 and opposed rigid end portions 38. The rigid end portions 38 include an inner end portion and an outer end portion. Each inner portion has an annular recess 40 circumferentially disposed on an interior surface thereof for engagement with the annular protrusions 16 of the vent tube 12.

A pair of hose clamps 44 are dimensioned for coupling the pair of flexible hoses 30 to the vent tube 12. The hose clamps 44 adjustably couple over the inner end portions and the end portions 14 of the vent tube 12.

In use, one of the flexible hoses 30 is placed over the vent line of the fuel tank 32. As the fuel is pumped out of the fuel nozzle 34 into the tank 32, air from within the tank 32 is forced outwardly of the vent line and in contact with the whistle alarm 20, The air will travel through the apertures 28 thereby creating an audible whistle. The audible whistle will gradually decrease as the tank fills with fuel and will cease once the fuel tank 32 reaches the "Filled" level thereby alerting the person pumping the fuel to stop.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A fuel overfill warning device for warning of potential overflow and spillage of fuel while refueling boats comprising, in combination:

a vent tube having an elongated and cylindrical configuration, the vent tube having a diameter, the vent tube having opposed open end portions having a diameter less than the vent tube, each of the open end portions having an annular protrusion circumferentially disposed thereon;

a whistle alarm positioned within the vent tube, the whistle alarm comprising an elongated body portion, the elongated body portion having beveled end portions, a pair of rods extending downwardly from the elongated body portion for securement to the vent tube, each of the beveled end portions having angularly disposed apertures therethrough;

a pair of elongated and cylindrical flexible hoses dimensioned for coupling with a vent line of a fuel tank, each of the hoses having a flexible body portion and opposed rigid end portions, the rigid end portions including an inner end portion and an outer end portion, each inner portion having an annular recess circumferentially disposed on an interior surface thereof for engagement with the annular protrusions of the vent tube; and a pair of hose clamps dimensioned for coupling the pair of flexible hoses to the vent tube, the hose clamps adjustably coupling over the inner end portions and the end portions of the vent tube.

2. A fuel overfill warning device comprising:

a vent tube, the vent tube having a diameter;

a whistle alarm positioned within the vent tube, the whistle alarm comprising an elongated body portion, the elongated body portion having beveled end portions, a pair of rods extending downwardly from the elongated body portion for securement to the vent tube, each of the beveled end portions having angularly disposed apertures therethrough; and a pair of flexible hoses each engaging opposing open end portions of the vent tube, the opposed open end portions of the vent tube having a diameter less than the vent tube.

* * * * *